June 6, 1967 J. N. COOPER 3,323,230

LANGUAGE TEACHER

Filed July 9, 1964

INVENTOR
JAMES COOPER

BY Hurvitz & Rose

ATTORNEYS 3,323,230
Patented June 6, 1967

3,323,230

LANGUAGE TEACHER

James N. Cooper, Hyattsville, Md., assignor of one-third to Hyman Hurvitz, Washington, D.C.

Filed July 9, 1964, Ser. No. 381,386
17 Claims. (Cl. 35—35)

Figures 1, 2:
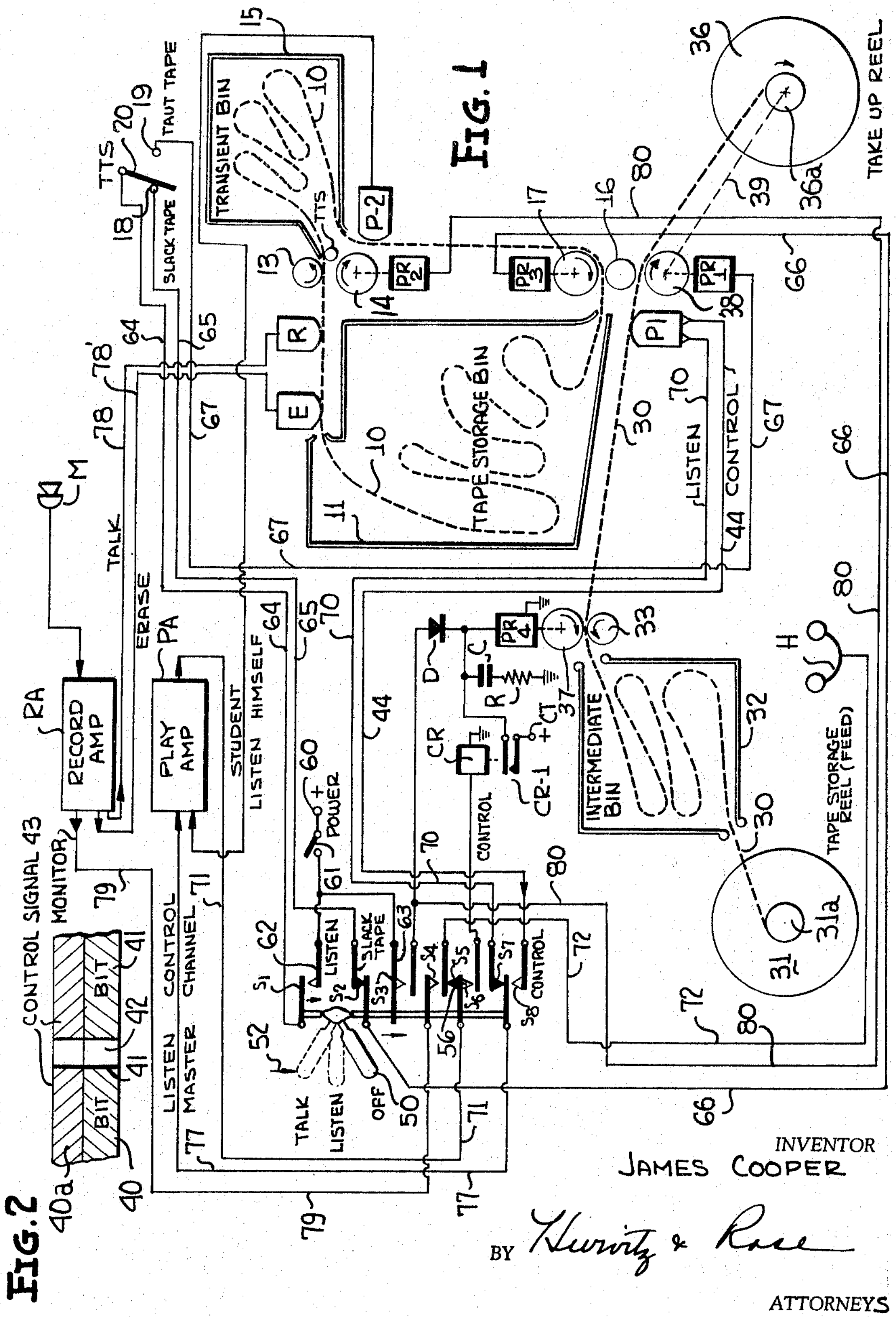

The present invention relates generally to language trainers, and more particularly to language trainers employing a separate student tape and master tape, in which extreme flexibility of operation is achieved in terms of possible operating cycles.

Briefly describing the invention, a master tape is provided having a limited number of recordings of each master item, inclusive of one. A student tape is also provided, which feeds from a tape storage bin into a transient bin while the student records, and from the transient bin into the storage bin while he listens to his recording. Existence of taut tape in the storage bin, on completion of the listen operation causes operation of the master section of the system to repeat a bit. The cycle is normally initiated by listening to the bit, and this can be done as many times as desired although the bit is recorded only once, and the student talk and listen to self cycle follows when the student feels he has mastered the sound of the bit.

A cycle of Listen to Master, Student Record, and Student Listen to Self can be repeated as many times as desired, with no re-recording step.

The cycle of operations can be modified as desired by modifying certain control signals on the master tape, and/or by varying the number of recordings of each bit.

It is an object of the present invention to provide a system of language training wherein a master tape can be manipulated to provide repetitive play-back of an item, for any desired number of repetitions, by manipulation of a switch to a repeat position for each repetition.

It is another object of the invention to provide a language trainer wherein each complete cycle of the trainer, including the steps of (1) student listen to master item (2) student record (3) student listen to self on playback (4) student listen to repeat of master items, is accomplished by an operation of a single switch, and wherein as many repeats of the cycle as desired can be achieved by repeats of operation of the master switch.

It is a further object of the invention to provide a system of language training requiring only a single recording of each master item, but permitting as many repeats of the master item as desired by the individual student.

It is still another object of the invention to provide a language training tape recorder requiring no tape rewind, but in which all tape reels are driven in one direction only at all times.

Another object of the invention resides in a language trainer involving no possibility of tape breakage by virtue of any sequence of manipulation of the controls.

A further object of the invention is to provide instant playback of each student recording in a language trainer, regardless of length of the student recording.

It is another object of the invention to provide a language trainer which provides an immediate "compare" step following playback of each student recording.

It is a further feature of the invention to provide a system of language training involving requiring sequences which are completely under the control of the individual student, who need only manipulate a single switch to produce the sequence preferred.

Another object of the invention is to provide control of a master tape such that the tape always feeds back to a correct position for replay of a master item without reel manipulation or tape braking.

It is still another object of the invention to actuate a master tape from reel to reel via a tape bin, the reels being engaged to spindles by virtue of reel weight alone, so that reels are free to move in either direction independently of spindle movement, to avoid tape breakage.

The above and still further objects, features and advantages of the present invention will become apparent upon consideration of the following detailed description of one specific embodiment thereof, especially when taken in conjunction with the accompanying drawings, wherein:

The single figure of the drawings is a schematic circuit diagram of the system of the invention.

Referring now to the accompanying drawings, and describing a three step cycle of operations, reference numeral 10 denotes an endless magnetic tape utilized for student recording and reproducing and generally called a student tape. Tape 10 is normally stored in a transient tape storage bin 11, from which it is drawn past an erase head E and a record head R by capstan 16, when the latter is engaged by pressure roller 14 in response to force applied by solenoid PR2. The capstan 16 and pressure roller 14, after drawing tape 10 over record head 13, push the tape into a transient storage bin 15, where the tape subsists as a free loop. When it is desired to listen to the material recorded in the free loop of tape, the tape is drawn out of bin 15 by capstan 16 when engaged by pressure roller 17 and past a readout head P–2. Capstan 16 and pressure roller 17 serve to feed the tape 10 back into storage bin 11, at the same time that the tape is being drawn out of bin 15.

Located adjacent the input port of transient storage bin 15 is a two position tape tension switch TTS, having two stationary contacts 18, 19, and a movable arm 20.

Arm 20 contacts contact 18 so long as the tape within bin 15 is slack, but is contrained to move to contact 19 by tape 10 when that tape is taut, i.e. the bin is empty.

Briefly describing a cycle of operations of tape 10, the position of arm 20 is sensed and if tape 10 is within bin 15, it is fed out and into bin 11. When bin 15 is empty recording can proceed via record head R, one tape then being fed into bin 15 and only the recorded length of tape is stored in bin 15 when student recording is complete. On completion of recording on the student tape 10, a control switch, hereinafter described, is operated, whereupon the tape 10 is fed out of bin 15 past readout head P2, via capstan 16, and into bin 11. On completion of read out, tape 10 becomes taut in bin 11, contact 19 closes and the student operation is complete.

Since only recorded tape is stored in bin 15, the end of readout is signalled by transfer of arm 20 to contact 19, and each readout persists precisely long enough and only long enough to complete readout of recorded material, no more and no less, regardless of how long the recorded length of tape may be.

In addition, read out of tape 10 occurs immediately after recording, with no intermediate time elapse.

Signal is supplied to record head R and to an erase head E located antecedent to record head R, via a microphone M and a record amplifier RA.

A further tape 30 is provided, usually called a MASTER tape, and which is initially located on a tape storage reel 31. The tape passes through an intermediate storage bin 32, over a feedback capstan 33, via a readout head P1 and thence via readout capstan 16 to a take up reel 36. The reel 31 is braked slightly by friction alone, when it is pulled by capstan 16. The tape 30 is pressed against capstan 33 by a pressure roller 37 and solenoid PR4, which acts to re-feed tape into bin 32, which has passed therethrough, but is otherwise idle.

Capstan 16 acts with pressure roller 38, when the latter is actuated by solenoid PR1, to draw the tape 30 past readout head P1, and take up reel 36 is driven by roller 38 via a slipping belt 39, onto reel 36. The latter can permit backup of the tape when solenoid PR4 is energized to feed tape back into bin 32, since the reel 36 is engaged by friction alone, to pin 36*a*, and by its own weight on its support.

Belt 39 tends to drive the pin 36*a* sufficiently fast that the length of tape 30 located between capstan 16 and reel 36 is always taut, but the reel has sufficient slip on pin 36*a* and on its support to prevent tape breakage due to rotation of pin 36*a* and to permit capstan 33 to pull tape from reel 36 on feed back.

The tape 30 may be recorded in two tracks, 40 and 40*a* (FIGURE 2). Track 40 contains bits 41 of teaching material, as words, phrases, sounds, and the like, with interleaved spaces 42. The other track 40*a* contains control signals 43 which are of any frequency within or without the recorded speech band, suitable examples being 40 c.p.s. to 9,000 c.p.s. P1 is a stereo head, delivering signals to separate leads, i.e. a control signal lead 44 and an information or listen signal lead 70.

Control of the system is achieved by a three position switch arm 50, which is "off" in the down position, as illustrated. The mid-position is a LISTEN position, and the upper position a TALK position. A bias spring 52 returns the arm 50 to LISTEN position, when released in TALK position, so that to talk arm 50 must be held in TALK position while the student records, and on releasing arm 50 the arm 50 moves automatically to Listen position, and the student hears what he has just recorded.

Arm 50 actuates switches denominated S1 to S8 as one reads down in the drawing. Only S1, normally open, is closed in the LISTEN position of arm 50.

Switches S2–S8 are actuated by arm 50 in the TALK position, from their normal conditions, specified by a C for closed and an O for open.

| | FROM | TO |
|---|---|---|
| S2 | C | O |
| S3 | O | C |
| S4 | O | C |
| S5 | C | O |
| S6 | O | C |
| S7 | C | O |
| S8 | O | C |

The normal conditions under the heading FROM, subsist for OFF and for LISTEN positions of arm 50.

D.C. power is supplied at terminal 60, and thence via ON-OFF switch 61 to contacts 62, 63, of switches S1, S3, respectively. With switch 61 closed, and arm 50 in OFF position, switches S1 and S3 are open.

With arm 50 in LISTEN position, only switch S1 closes, the remaining switches being unaffected. Power is then conveyed via lead 64 to arm 20. If tape 10 is slack, a circuit is completed, via lead 65, switch S2 and lead 66 to solenoid PR3. Capstan 16 then pulls tape 10 out of bin 15. When tape 10 becomes taut, it closes contacts 19, 20, which transfers power to lead 67, and energizes solenoid PR1, feeding MASTER tape 30 past readout head P1. The information or listen signal derived by head P1 proceeds via lead 70 to switch S7, now closed, and thence to play amplifier PA. The output of play amplifier PA proceeds via lead, and switch S5, now closed, to lead 72, and thence to head phones H. The student hears a recorded bit, as 40 or 41, and returns switch arm 50 to TALK position, during gap 42, opening switches S1, S2, S5, S7, and closing switches S3, S6, S8.

Closure of switch S3 transfers D.C. power from terminal 60 via diode D to solenoid PR4, which pulls tape 30 back into bin 32. The diode D has a timing circuit consisting of capacitor C and resistance R in series, connected across solenoid PR4. After the time required for capacitor C to charge to the voltage of terminal 60 (24 v.) its voltage back biases diode D and prevents further passage of solenoid operating current, about 4 mils. The control signal co-extends with the recorded item, and a gap in control signal occurs between items. The function of diode D and timing circuit CR is to start the tape 30 back into bin 32 for a time sufficient to bring the control head P1 into conjunction with the control track while tape 30 is still moving back. At this point control current proceeds via contacts 56 to sensitive relay CR which pulls in its contacts CR1, applying 24 v. from terminal CT to solenoid PR–4. The solenoid thus remains operating during read-out of control signal.

During read-out of control signal, contacts S3 may remain closed or may open, depending on how promptly and rapidly the student talks. If the student is still talking when control signal at contacts S4 closes, contacts CR–1 will open but capacitor C will remain charged since 24 v. is available at contacts S3 and prevents transfer of sufficient operating current to solenoid PR–4 to keep it pulled in, while maintaining enough flow to keep capacitor C charged.

If arm 50 is no longer in talk position while control signal on line 44 continues as is normally the case, there will be zero power at contacts S3, but power will continue to be supplied via contacts CR–1.

Upon termination of control current capacitor C will discharge through the winding of solenoid PR–4. The same will occur if contacts S5 is closed on cessation of control signal, but the discharge occurs only after contacts S5 open.

In general, rewind may be about twice as fast as student talk, and talk is succeeded by student listen to self, so that it can be surely expected that rewind of tape into bin 32 will terminate during talk-listen time. On this basis, also tape feed back need not be faster than feed forward. Control signal is transferred via lead 44, contacts S8, lead 77, play amplifier PA, lead 71, contacts S6, to control relay CR. Accordingly, a length of tape equal to that occupied by the read out item is stored in bin 32, and tape 30 is accurately positioned to repeat read out of item previously read out.

While tape 30 is being repositioned, the student records by talking into microphone M, via record amplifier RA, talk lead 78 and record head R. Erase signal is simultaneously supplied via lead 78' to erase head E. Tape 10 is fed past record head R by capstan 13, when solenoid PR2 is energized. The circuit for energizing solenoid PR2 proceeds via lead 80, switch S3, switch 61 and power terminal 60.

Upon completion of the TALK operation, arm 50 is released and moves to LISTEN position. At this time tape 30 has been repositioned, and this can be assured by operating capstan 33 at higher speed than is used for recording and readout. With arm 50 in LISTEN position, and tape 10 being now slack, tape 10 will be read out, completing the student TALK-LISTEN cycle, and switch TTS will then go to taut position and cause a repetition of readout of tape 30, which represents the initial item of a new cycle.

The latter cycle is called a three step cycle consisting of the steps (1) LISTEN TO MASTER (2) STUDENT RECORD (3) STUDENT LISTEN TO SELF.

It is usually considered desirable to follow the reproduction of the STUDENT LISTEN TO HIMSELF step by a confirmation, i.e. by a LISTEN TO MASTER step. In the three step process the first step of the succeeding cycle serves to provide confirmation. While recording the student listens to himself via monitor lead 79, contacts S4 and lead 72 to head phones H.

When the student is satisfied with his rendition of a bit or item he has only to omit the TALK step of the cycle by failing to operate arm 50 to talk position, to bring a new bit into the system, i.e. no positive action is required to achieve a new bit.

The system of the invention permits the student no rest. Unless the student actuates the TALK switch promptly after a bit is played from the master tape, he loses the bit. He must, therefore, remain alert.

The student can actuate the TALK switch and then refuse to talk or to release the switch, but this requires that he actively hold the switch. Once the switch is released the action proceeds inexorably.

The control signal 43 may be inserted preceding each pair of successive duplicate bits, and not between the items of the pair. The cycle of events then consists of four steps:

LISTEN MASTER
STUDENT RECORD
STUDENT LISTEN TO SELF
LISTEN MASTER

This mode of operation is inherent in the system as described, if the master tape is prepared as described in the present paragraph.

Briefly describing the four step method, the student moves arm 50 to LISTEN and hears the bit. As soon as the bit terminates, and during the space between bits, arm 50 is moved to TALK, and the student repeats the bit into microphone M. On completion of recording the student moves arm 50 to LISTEN, whereupon the student record is reproduced.

Assume that a control signal 43 precedes the first bit on the tape. When the arm 50 goes to talk position solenoid PR4 is energized pulling the tape into bin 32 until the starting position of the tape, where recorded control signal 43 is precisely at the head P1.

After the student has recorded and listened to his recording, the master tape will now be readout, to provide information. But, by failing to actuate arm 50, the duplicate bit will now be read out, and only thereafter will arm 50 be moved to TALK.

Accordingly, the student can readily operate the system of FIGURE 1 in the three step procedure, if each MASTER bit is recorded only once and in the four step procedure if recorded twice, provided in each case that the control signal precedes each bit for the three step method and each pair of duplicate bits, for the four step procedure.

Obviously, alternative cycles can be provided, for example.

(1) STUDENT LISTEN MASTER
STUDENT LISTEN MASTER
STUDENT RECORD
STUDENT LISTEN SELF
STUDENT LISTEN MASTER
(2) STUDENT LISTEN MASTER
STUDENT LISTEN MASTER
STUDENT RECORD
STUDENT LISTEN SELF
(3) STUDENT RECORD
STUDENT LISTEN OWN RECORDING
STUDENT LISTEN MASTER

Essentially then, the system is designed to be flexible in terms of pedagogical procedure, by proper design of tape only. It will be obvious, in addition, that for reels 31, 36, or for either of these, bins may be employed.

As a further feature the student may listen to a MASTER bit as many times as he chooses, although it may be included only once in the master tape, by manipulation of switch arm 50. This is accomplished by manipulating arm 50 to talk position for only a long enough time to slacken tape 10, and then releasing it. The cycle set into the machine will then proceed, but without the student TALK and LISTEN to self steps.

It is impossible to break the tape 30, by manipulation of arm 50, since no positive drive exists therefor at reel 36 nor at reel 31. At the same time the tape will not unwind from reel 31 unless pulled, and the reel 31 and its pin, 31*a*, provides enough friction to maintain the tape taut as it is pulled through bin 32.

While I have described and illustrated one specific embodiment of my invention, it will be clear that variations of the details of construction which are specifically illustrated and described may be resorted to without departing from the true spirit and scope of the invention as defined in the appended claims.

I claim:

1. A tape recording system, said system including a master tape having recorded thereon information signal and control signal, comprising a master reproduce section, a student record and reproduce section, said master reproduce section including means for reproducing said information signal and control signal from said master type, said control signal occurring for the duration of each item of recorded information, a tape storage reel for said master tape, a tape take up reel for said master tape, an intermediate bin located intermediate said reels, said means for reproducing being located intermediate said intermediate bin and said take up reel, means for pulling back tape from said take up reel and pushing the pulled back tape into said intermediate bin, and means responsive to failure of continued reproduction of said control signal by said means for reproducting during pulling back of said tape for terminating said pull back.

2. A tape recording system employing a master tape having recorded thereon a plurality of items, and an endless student tape, comprising an initial storage device for said master tape, a transient storage device for said master tape, a main bin for said student tape, a transient bin for said student tape, means for at will reading out an item from said master tape while transferring a length of said tape from said initial storage device to said final storage device, means for at will recording an item on said student tape and for thereafter reading out said last named item, means responsive to operation of said last named means for feeding a length of said master tape equal to said length of said master tape into said transient storage from said final storage device, whereby said master tape is positioned for automatic repeat of said item from said master tape during transfer of said tape from said transient storage device to said final storage.

3. The combination according to claim 2 wherein is provided a recorded area of a starting position for each of said items on said master tape, and wherein said item may consist of one or more duplicate bits at will.

4. A tape recorder system for teaching, comprising an endless student section of magnetic tape, a main tape storage bin containing a length of said tape, a transient tape storage bin, means including a first capstan for at will drawing a length of said tape from said main bin while recording material on said length of tape and for storing the recorded tape in said transient tape storage bin, means including a second capstan for drawing said recorded tape from said transient storage bin while reproducing the recorded material, and for restoring the tape drawn from said transient tape storage in said main storage bin, and means for assuring removal of tape from said transient bin immediately prior to operation of said first mentioned means, whereby the length of tape within said transient bin following operation of said first mentioned means consists substantially only of recorded tape.

5. An instantaneous response tape recorder, comprising a tape bin, having a single slot for both entrance and exit of said tape,
a first capstan located in immediate proximity to said slot,
a first pinch roller for compressing said tape against said first capstan,
means for rotating said first capstan in such sense as to push said tape into said slot,
a record head cooperating with said tape and located upstream of said first capstan and in close proximity thereof,
a readout head cooperating with said tape and located in close proximity to said slot, and
a further capstan and pinch roller located downstream of said readout head for pulling said tape at an angle of approximately at least right angles to its normal direction of travel while traveling into said slot, in traveling from said slot in said tape bin past said readout head.

6. The combination according to claim 5 wherein is provided a micro-switch actuator located in said slot in position to be actuated by said tape when said tape is taut.

7. In a tape recorder for winding tape from a supply reel to a take-up reel in short steps, an immovable bin for transiently storing said tape in loose, free layers, said bin including an inlet and an outlet, means guiding said tape from said supply reel through said inlet and via said outlet to said take-up reel, a feedback capstan drive located adjacent said outlet and arranged to drive tape into said bin via said outlet, a feed forward capstan drive for pulling said tape from said supply reel through said bin, and means for rotating said take-up reel to take up all tape pulled by said feed forward capstan drive, said last means including only a frictional drive for said take up reel, whereby said feedback capstan drive can withdraw tape from said take up reel for feed into said bin.

8. The combination according to claim 7 wherein is provided discrete items recorded on said tape, and wherein is further provided control signals on said tape indicating the locations on said tape of said discrete items.

9. The combination according to claim 8 wherein is provided means responsive to said control signals for metering feedback of said tape into said bin of discrete numbers, including one, of said discrete items.

10. In a tape recorder for operating in respect to a tape having discrete recorded items separated by spaces, a reproduce head, a stationary bin storing said tape in loose, free layers, a switch having a first position and a second position, means responsive to actuation of said switch to said first position for reproducing one of said discrete recorded items by feeding forward a predetermined length of said tape, means responsive to momentary actuation of said switch to said second position for feeding back a length of said tape into said bin, said length of said tape being substantially equal to said predetermined length.

11. In a tape handling device, a first stationary tape storage bin for storing said tape in loose, free layers, switch means located in said first tape storage bin for sensing whether said tape is taut or slack in said first tape storage bin, a control lever operative to record and reproduce positions selectively, means responsive both to actuation of said control lever to said record position and to said switch means to sense if said tape is slack, and means responsive to said last means on sensing of slack tape for pulling tape from said first tape storage bin until said tape is taut and for automatically thereafter feeding tape into said first storage bin in a record operation.

12. In an endles tape handling system, a first tape storage bin having a single inlet-outlet slot for said tape, a second tape storage bin having a separate tape inlet slot and outlet slot, a switch actuator located adjacent said single inlet-outlet slot, said tape following a path into said inlet-outlet slot on one side of said switch actuator and out of said inlet-outlet slot on the opposite side of said switch actuator, into said inlet slot of said second tape storage bin and out of the outlet slot of said second tape storage bin in an endless loop.

13. The combination according to claim 12 wherein is provided a single capstan drive for said tape located adjacent said inlet slot for said second tape storage bin and rotatable to push said tape into said inlet slot while pulling said tape from said inlet-outlet slot.

14. The combination according to claim 13 wherein is further provided a further capstan drive for said tape located adjacent said inlet-outlet slot and positioned and rotatable to push tape into said inlet-outlet slot while pulling tape from said outlet slot.

15. In a tape handling system, a supply reel for said tape, a take-up reel for said tape, a stationary bin located intermediate said reels and storing tape in loose, free layers, said bin having an inlet and an outlet, said tape being threadable through said inlet, to said outlet and from said outlet to said take up reel, a reel drive for said take up reel, means coupling said take up reel only frictionally to said reel drive, a first capstan drive located adjacent said outlet, said first capstan drive being rotary to push said tape into said outlet, a second capstan drive arranged to pull said tape from said outlet and to actuate said reel drive to rotate said take up reel at sufficient speed to maintain said tape taut.

16. A tape recorder including a first support for a supply reel of tape, wherein said supply reel rests directly on said first support in area contact therewith and said first support couples to said supply reel only frictionally over the area of said contact by virtue only of frictional forces existing between said supply reel and said area of contact due to the weight of said reel alone, a second support for a take up reel for said tape, wherein said tape up reel rests directly on said second support in area contact therewith and said second support for said take up reel couples to said take up reel by friction alone over the area of said contact, a readout head located intermediate said reels and a capstan drive for pulling said tape past said readout head, wherein is provided a tape storage bin located in the path of said tape intermediate said supply reel and said capstan forward drive, said bin including an exit and an inlet for said tape, and wherein is provided a feedback capstan drive for pushing tape which has passed through said bin back into said bin via said exit.

17. The combination according to claim 16 wherein is provided means for metering back into said tape a length of said tape substantially equal to the length of tape pulled therethrough.

References Cited

UNITED STATES PATENTS

| | | | |
|---|---|---|---|
| 2,989,594 | 6/1961 | McKaig. | |
| 3,018,063 | 1/1962 | Loewe et al. | 242—55.12 |
| 3,155,778 | 11/1964 | Meyer | 35—35.3 X |
| 3,176,927 | 4/1965 | Irazoqui | 226—118 X |
| 3,234,666 | 2/1966 | Cooper | 35—35.3 |

FOREIGN PATENTS

| | | |
|---|---|---|
| 919,366 | 2/1963 | Great Britain. |

EUGENE R. CAPOZIO, *Primary Examiner.*

W. GRIEB, *Assistant Examiner.*